April 25, 1944.　　　　　　G. D. COX　　　　　　2,347,254
SHEET SCORING AND SEVERING MACHINE
Filed Aug. 4, 1942　　　11 Sheets-Sheet 1
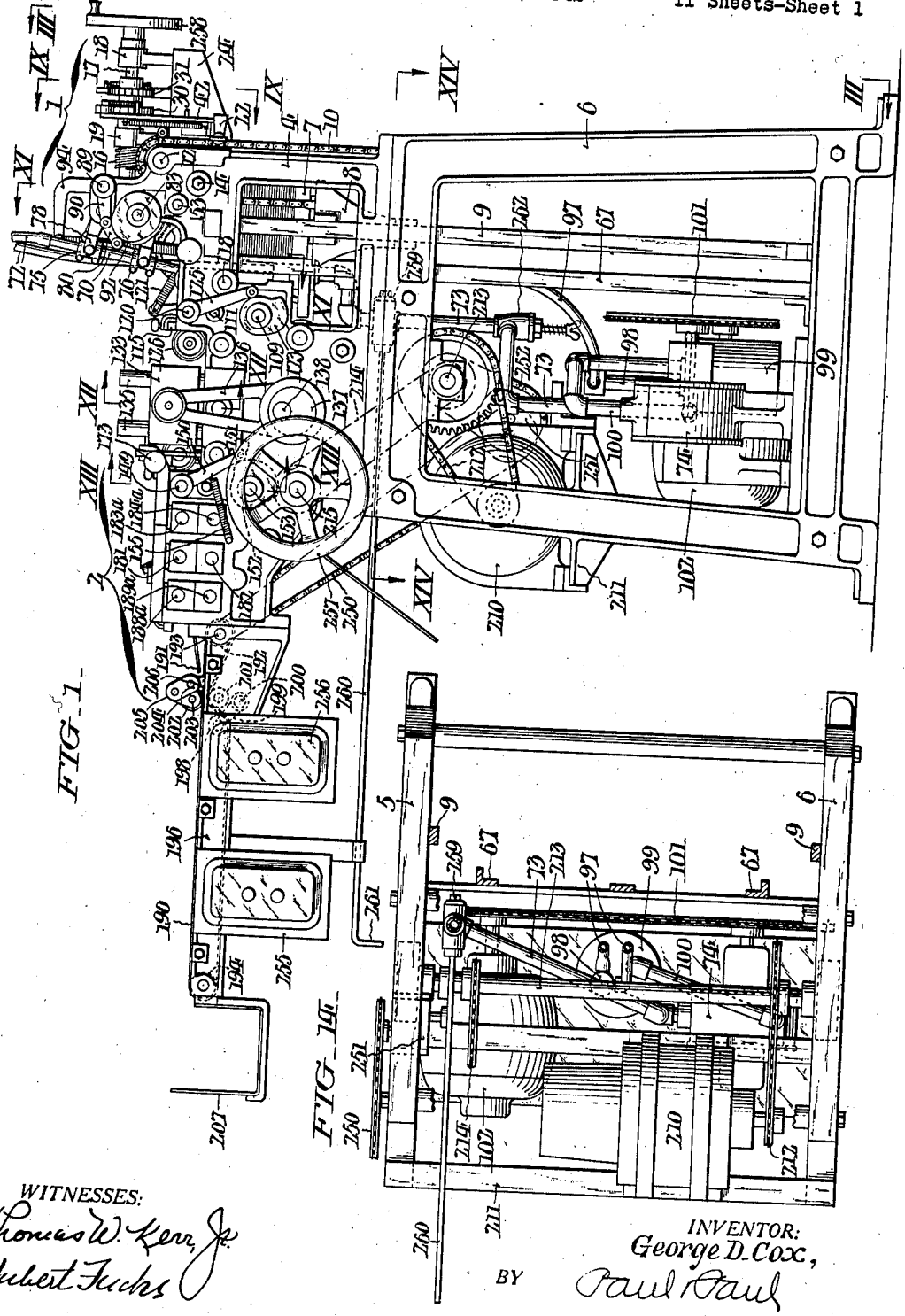
WITNESSES:
Thomas W. Kerr, Jr.
Hubert Fuchs
INVENTOR:
George D. Cox,
BY Paul & Paul
ATTORNEYS.

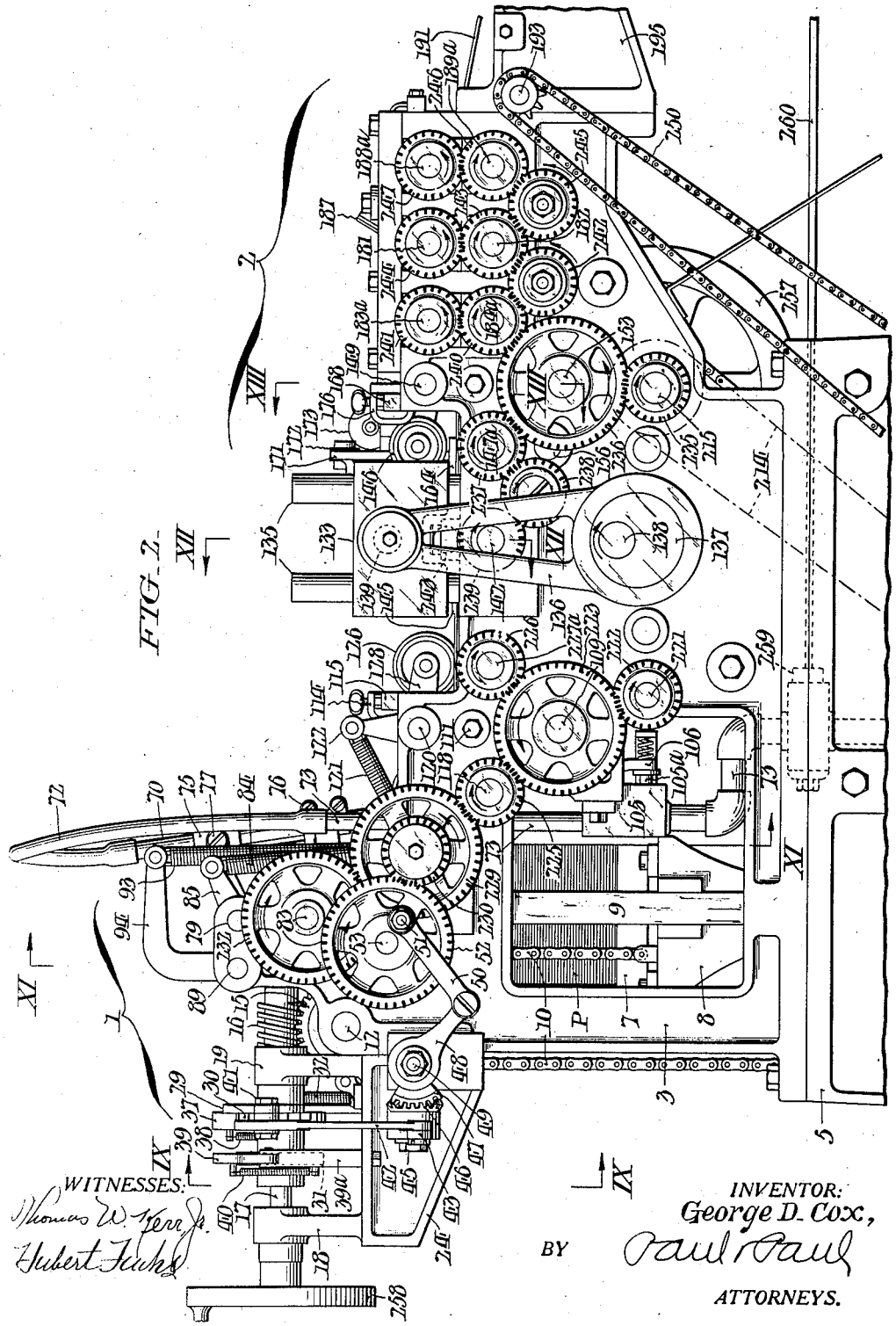

April 25, 1944.　　　　　G. D. COX　　　　　2,347,254
SHEET SCORING AND SEVERING MACHINE
Filed Aug. 4, 1942　　　11 Sheets-Sheet 3
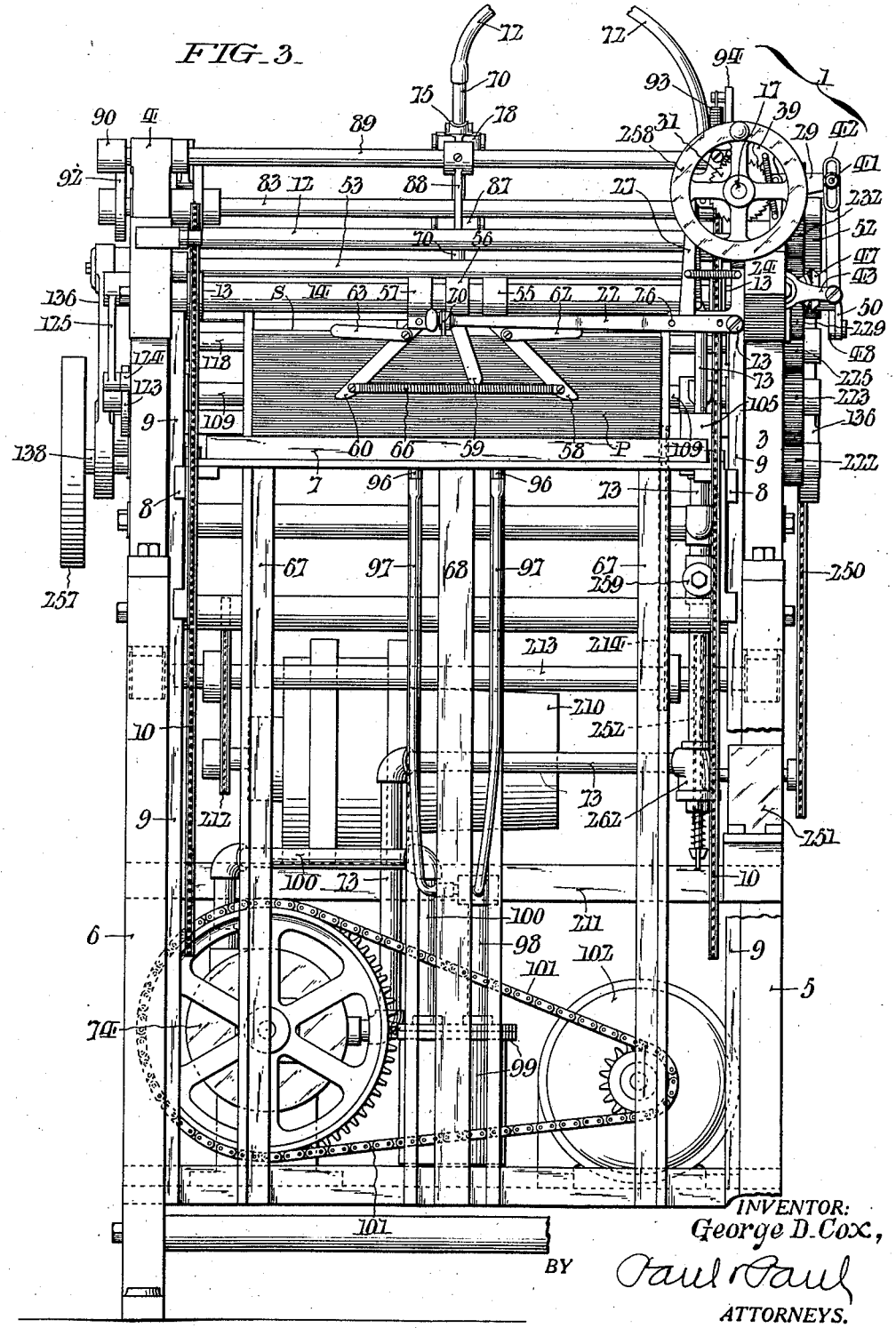
INVENTOR:
George D. Cox,
BY Paul & Paul
ATTORNEYS.

April 25, 1944.   G. D. COX   2,347,254
SHEET SCORING AND SEVERING MACHINE
Filed Aug. 4, 1942   11 Sheets-Sheet 4
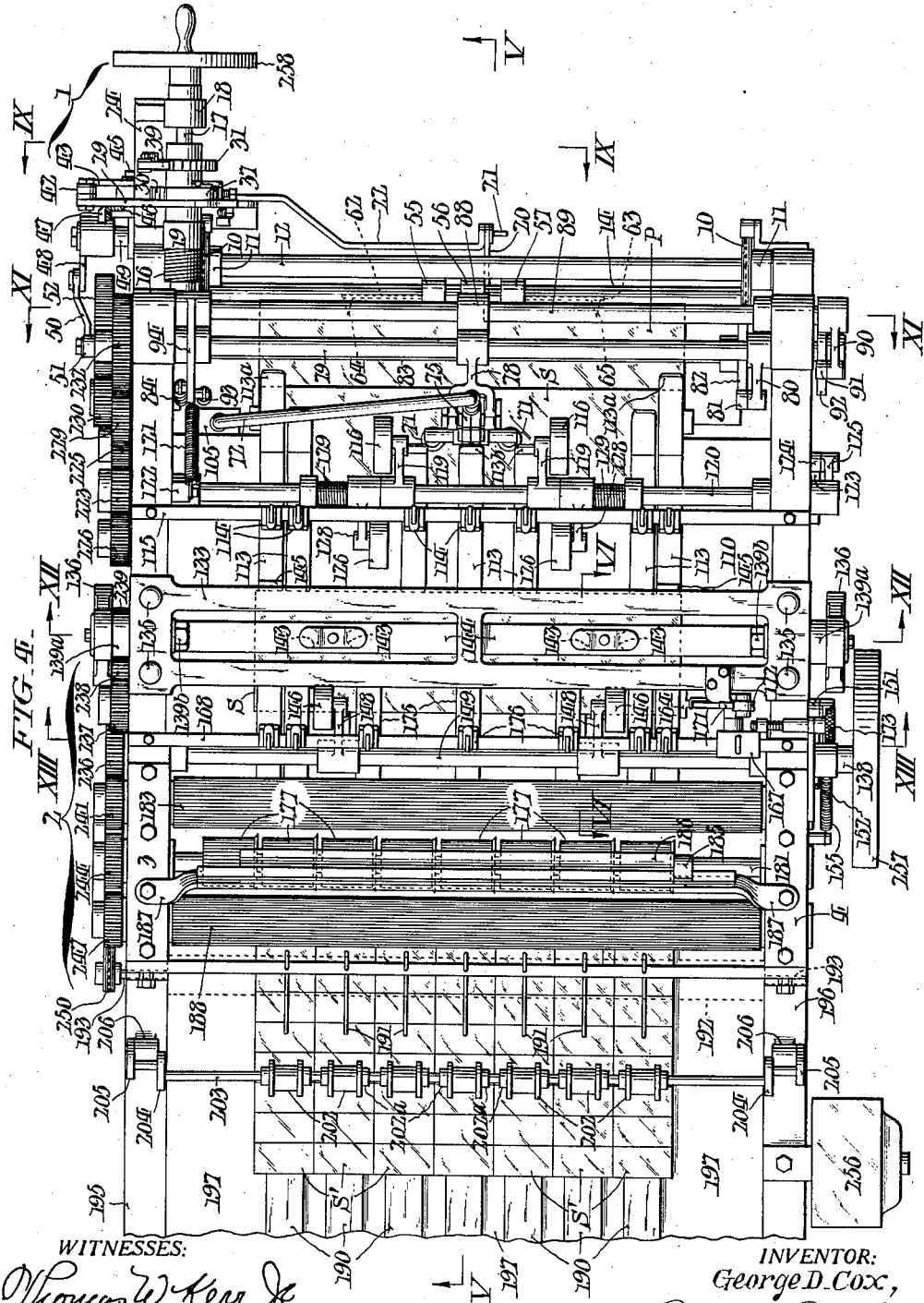
WITNESSES:
INVENTOR:
George D. Cox,
BY
ATTORNEYS.

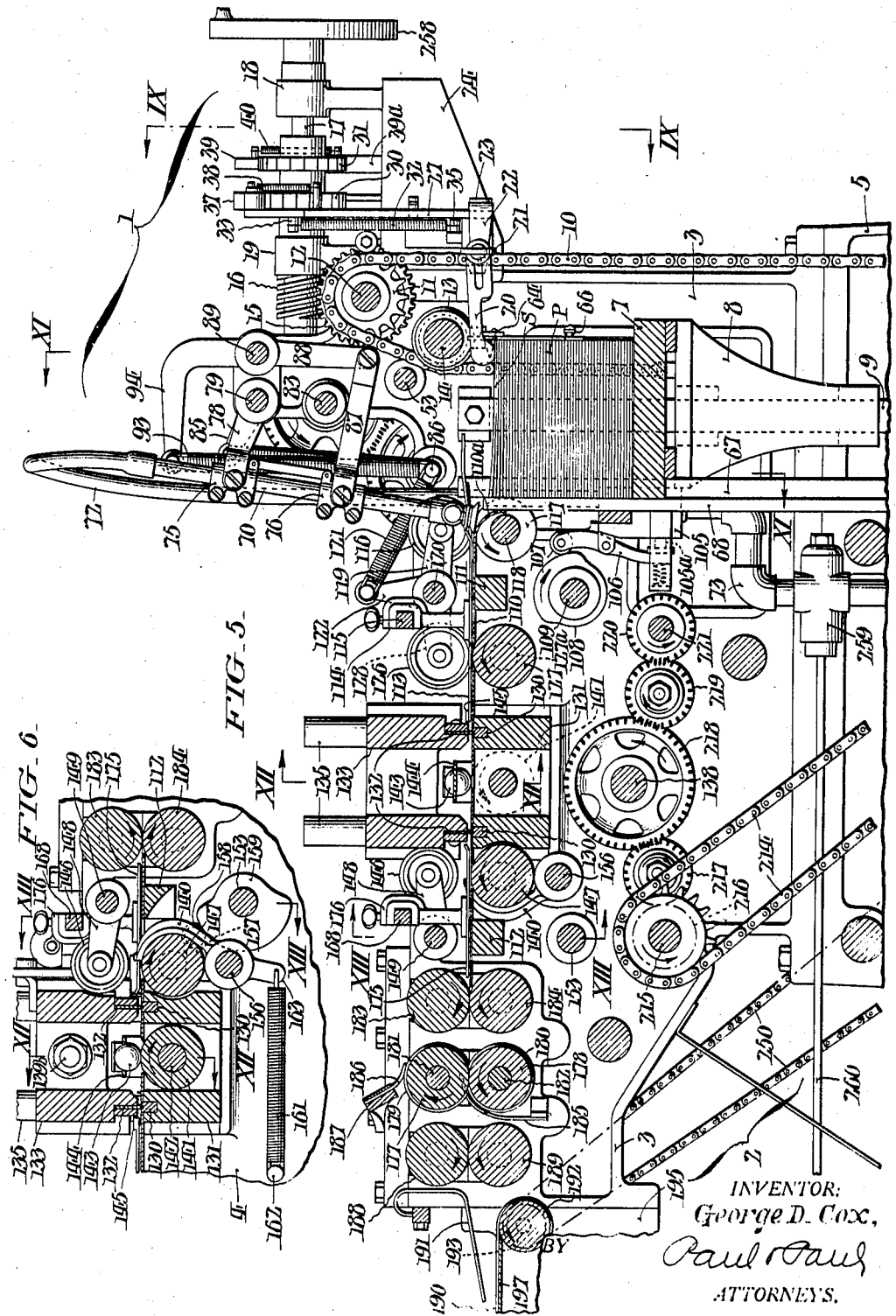

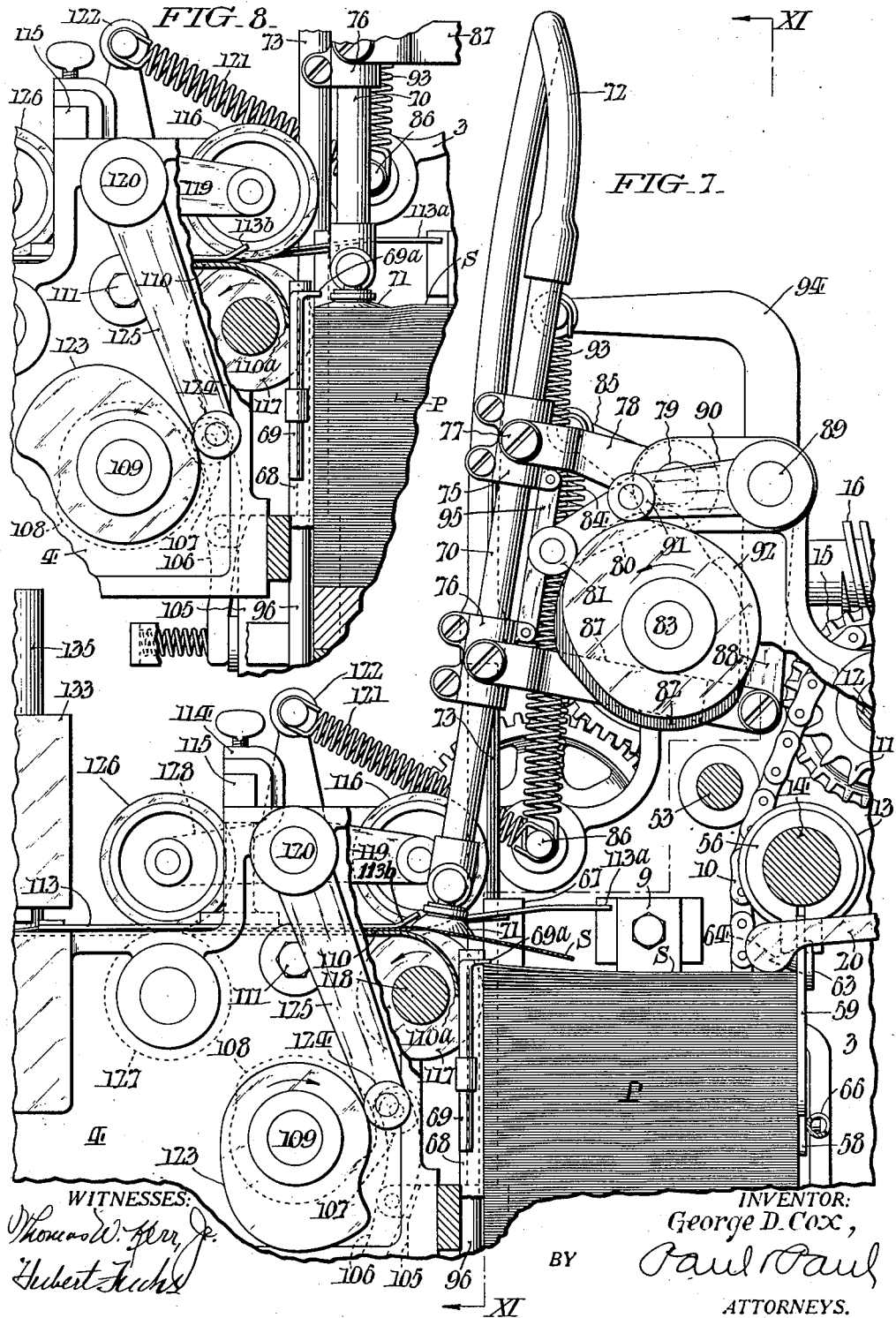

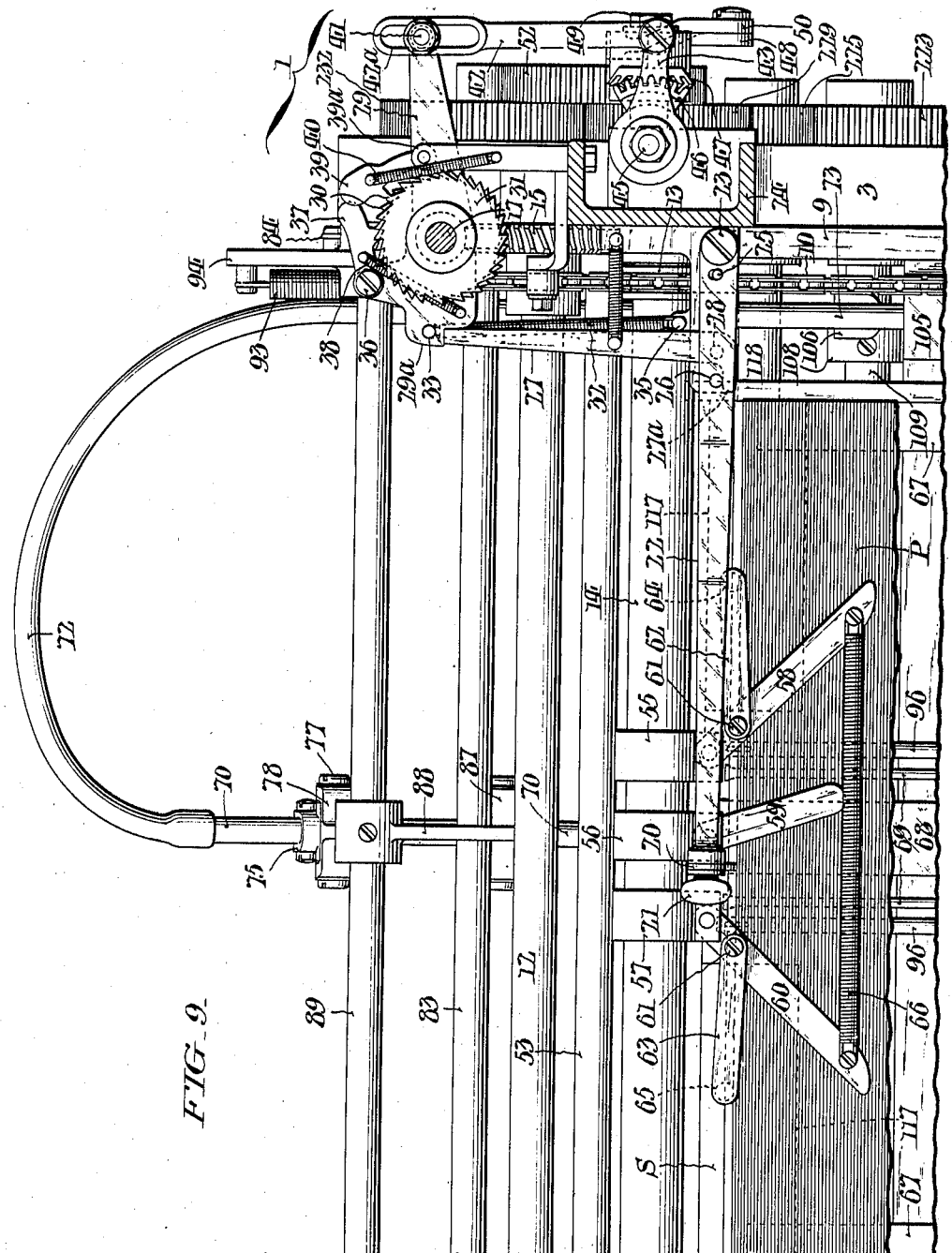

April 25, 1944.                G. D. COX                2,347,254
              SHEET SCORING AND SEVERING MACHINE
                 Filed Aug. 4, 1942        11 Sheets-Sheet 8
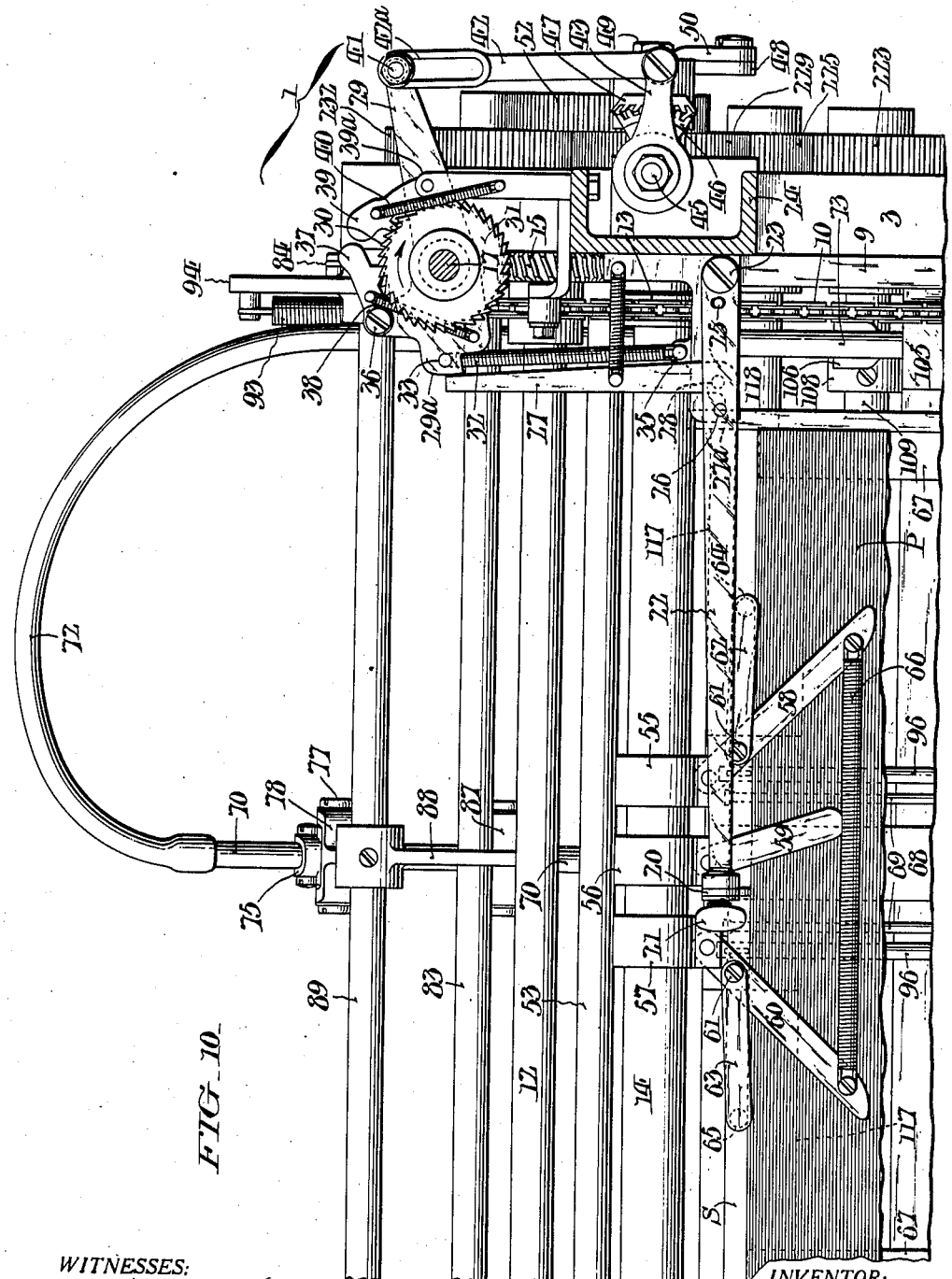
WITNESSES:
                                        INVENTOR:
                                        George D. Cox,
                                BY
                                        ATTORNEYS.

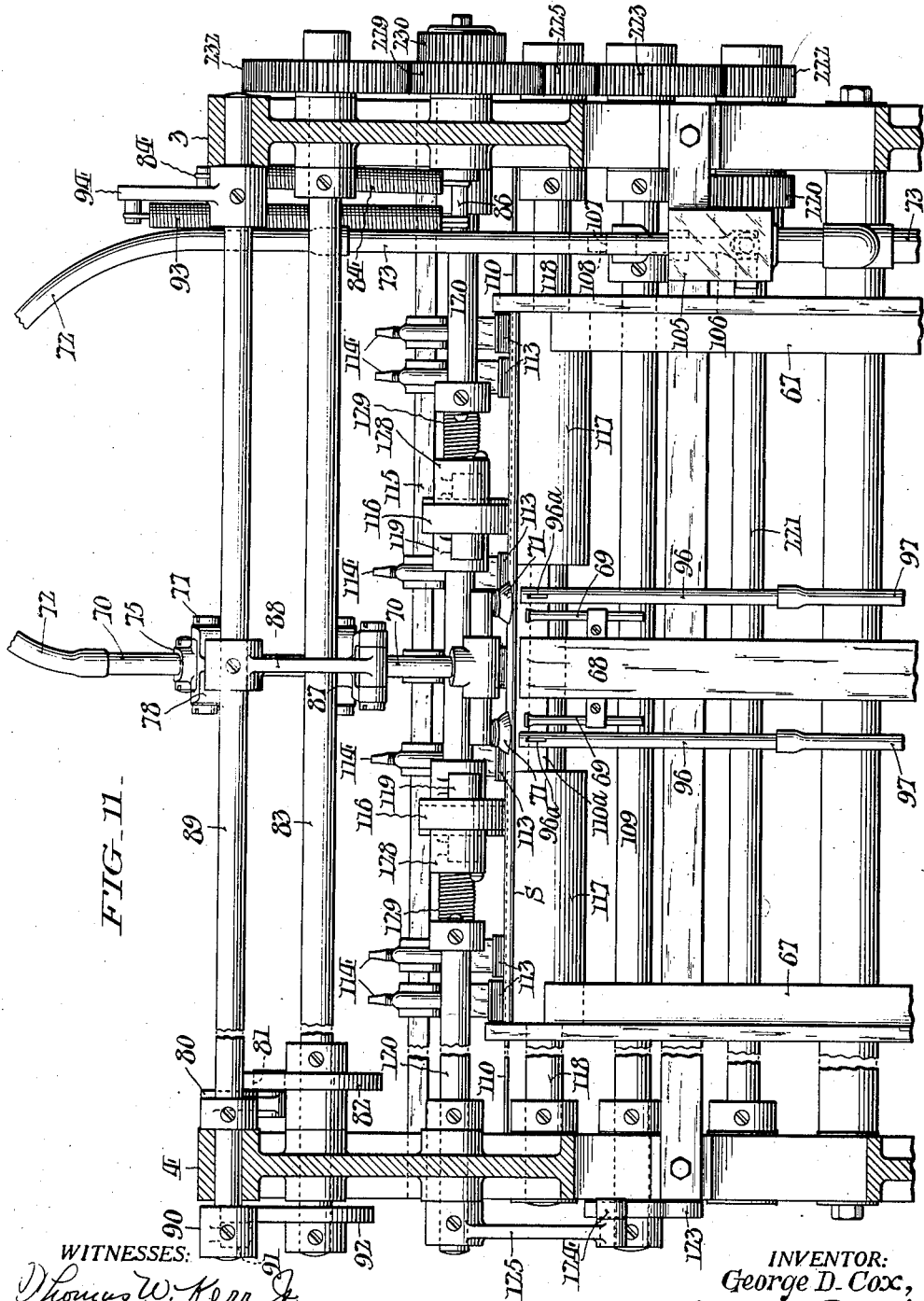

April 25, 1944.　　　　　G. D. COX　　　　　2,347,254
SHEET SCORING AND SEVERING MACHINE
Filed Aug. 4, 1942　　　11 Sheets-Sheet 10
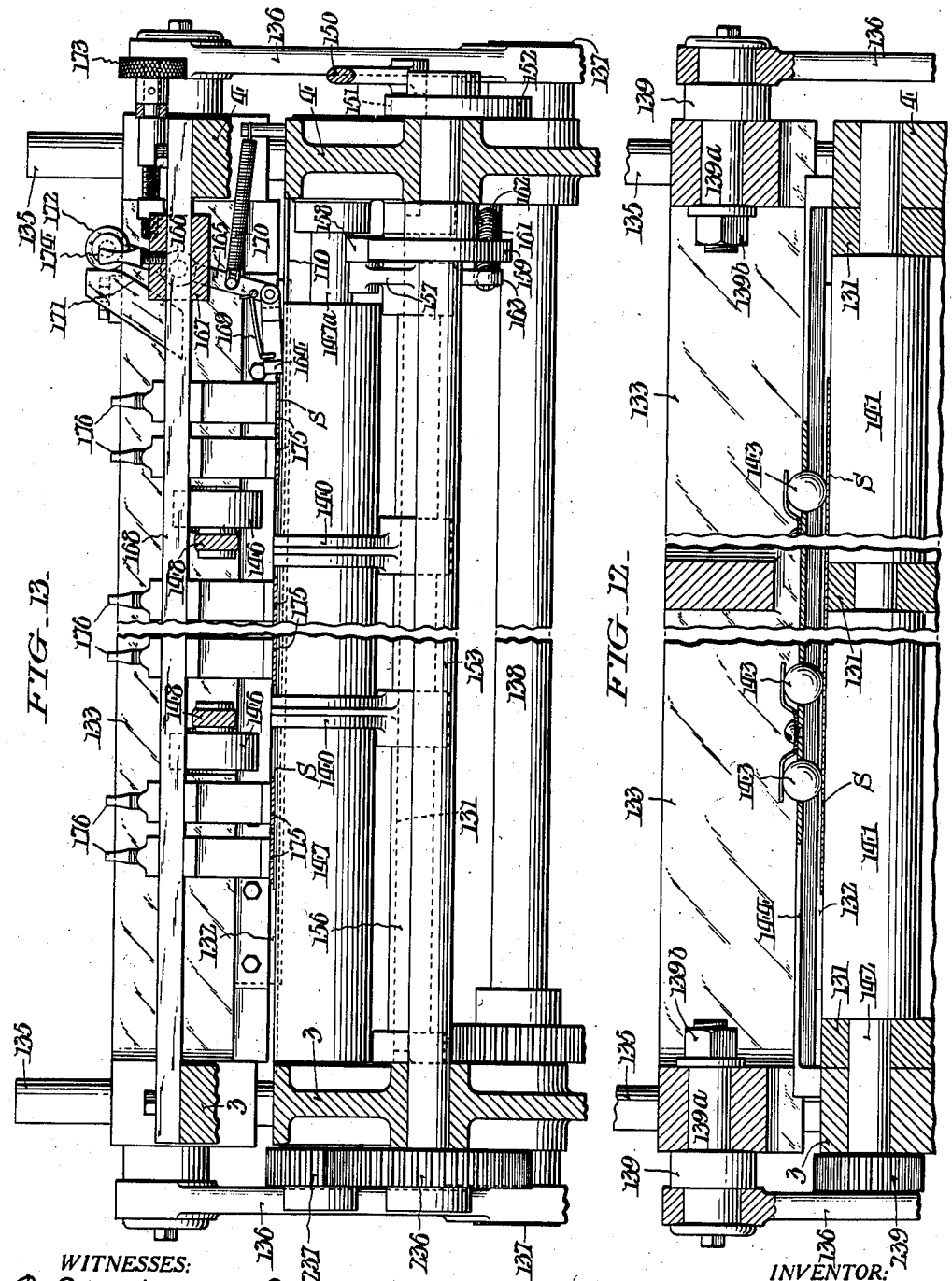
WITNESSES:
Thomas W. Kerr, Jr.
Hubert Fuchs
INVENTOR:
George D. Cox,
BY
ATTORNEYS.

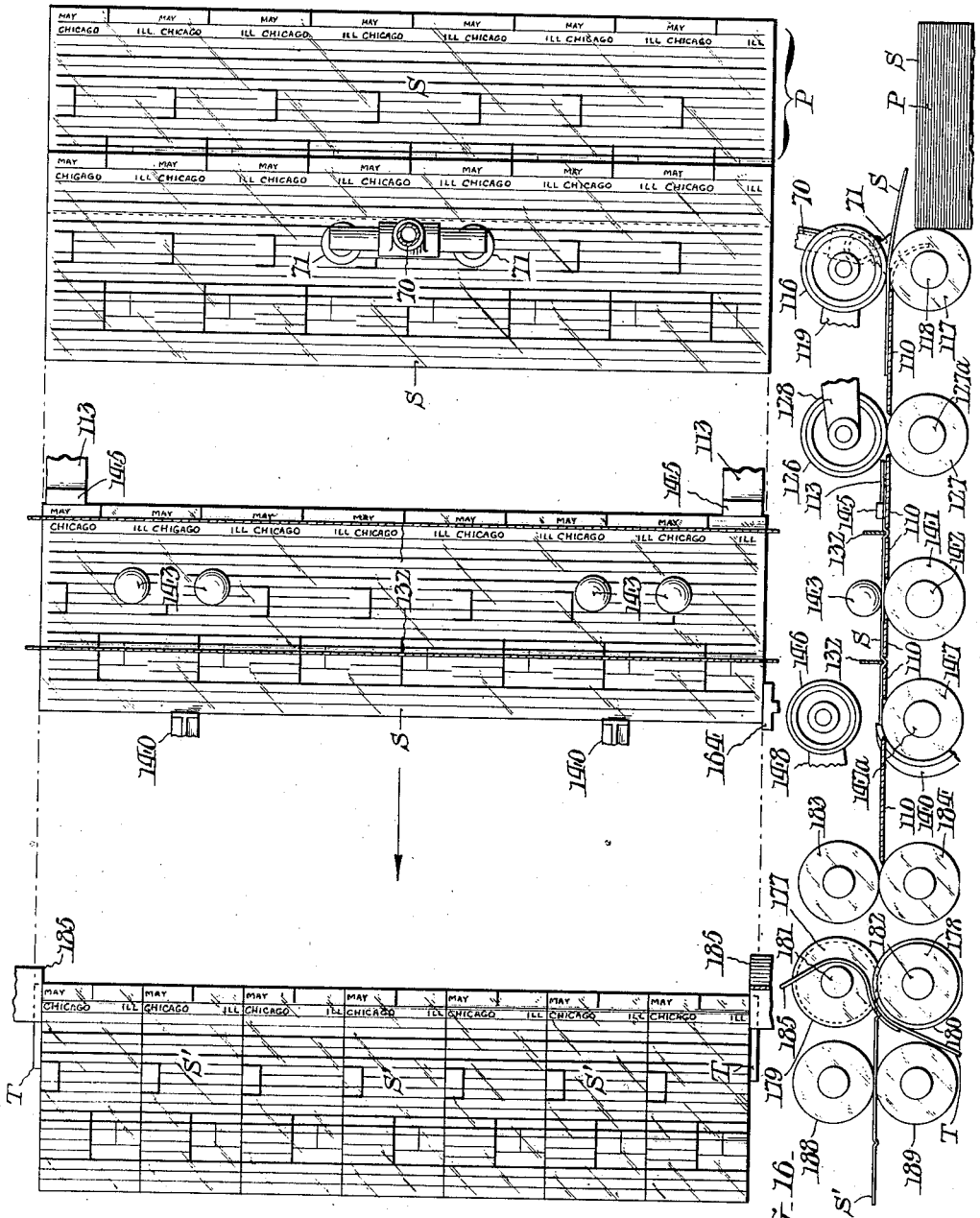

Patented Apr. 25, 1944

2,347,254

UNITED STATES PATENT OFFICE 2,347,254

SHEET SCORING AND SEVERING MACHINE

George D. Cox, Philadelphia, Pa., assignor to Williams and Marcus Company, Philadelphia, Pa., a corporation of Pennsylvania Application August 4, 1942, Serial No. 453,527

22 Claims. (Cl. 164—61)

This invention relates to sheet scoring and severing means, that is to say to machines for creasing sheets of paper or the like along predetermined lines, and for cutting them up into smaller sections or slips crosswise of the creased lines.

My invention has for its chief aim to simplify machines of the type referred to with a view toward enabling their operation at much higher speeds than possible with prior art machines designed for the performance of like operations, and securing a correspondingly increased out-put from them. This desideratum I realize in practice, as hereinafter more fully set forth, through provision of an improved feeding mechanism which can be relied upon to remove the sheets singly from the top of a supply pile, and through the further provision of an improved means by which the individual sheets successively presented thereto by the feeding means are scored along a line or lines transversely of the direction of feeding, and severed crosswise of the scoring line or lines into smaller sections, and the cut sections concurrently advanced, with assurance against the possibility of clogging, for ultimate delivery to a collecting receiver in as many separate piles.

The machine of my invention, in the form hereinafter disclosed by way of example, is particularly adapted for the production in quantity of slips or tickets such as are ordinarily used by telephone companies to record toll calls and information concerning them for subsequent billing, from pre-printed blanks which bear in multiple all the lines, legends, etc., necessary to the individual slips or tickets.

Other objects and attendant advantages will appear from the following detailed description of the attached drawing, wherein Fig. 1 shows, in elevation, one side of a sheet scoring and cutting machine conveniently embodying the present improvements.

Fig. 2 is a fragmentary view on a larger scale showing the elevation of the opposite side of the machine.

Fig. 3 shows the machine in end elevation as it appears when viewed in the direction indicated by the angled arrows III—III in Fig. 1.

Fig. 4 is a fragmentary view of a portion of the machine in top plan.

Fig. 5 is a longitudinal sectional view of the machine taken as indicated by the angled arrows V—V in Fig. 4.

Fig. 6 is a fragmentary detail sectional view taken as indicated by the angled arrows VI—VI in Fig. 4.

Fig. 7 is a fragmentary view corresponding to Fig. 5 and drawn to a larger scale.

Fig. 8 is a fragmentary view in turn corresponding to Fig. 7 with parts differently positioned.

Fig. 9 is a fragmentary view in cross section taken as indicated by the angled arrows IX—IX in Figs. 1, 2, 4 and 5.

Fig. 10 is a view corresponding to Fig. 9 with the parts differently positioned.

Fig. 11 is a fragmentary cross sectional view taken as indicated by the angled arrows XI—XI in Figs. 1, 2, 4, 5 and 7.

Figs. 12 and 13 are fragmentary cross sectional views taken as indicated respectively by the angled arrows XII—XII and XIII—XIII in Figs. 1, 2, 4, 5 and 6.

Fig. 14 is a plan sectional view taken as indicated by the angled arrows XIV—XIV in Fig. 1.

Fig. 15 is a diagrammatic view in plan showing how the operations of feeding, scoring and cutting are continuously carried out in the machine; and Fig. 16 is a diagrammatic view in side elevation corresponding to Fig. 15.

With more detailed reference to these illustrations, the numeral 1 comprehensively designates the feeding mechanism of the machine by which individual sheets are successively fed from a supply pile P to a scoring and severing mechanism in turn comprehensively designated by the numeral 2. The moving parts of the mechanisms 1 and 2 are sustained by a framework having laterally spaced parallel main side frames 3 and 4, and vertically arranged pedestal-like supplemental side frames 5 and 6 for supporting said main side frames at a suitable elevation from the floor.

From Figs. 3, 5, 7–10, it will be noted that the feeding mechanism 1 includes a platform elevator 7 for the sheet supply pile P, said elevator being supported at its ends by slides 8 which engage vertical guides 9 on the side frames of the machine. The elevator 7 is suspended by means of a pair of chains 10 which pass up and around sprocket wheels 11 on a transverse shaft 12 suitably journaled in the side frames 3 and 4, said chains also engaging grooved idler rolls 13 which are freely mounted on a fixed tie bar 14. Secured to the shaft 12 adjacent one end thereof is a worm wheel 15 which meshes with a worm 16 on a short longitudinally extending shaft 17 journaled in upstanding bearings 18 and 19 on the side frame 3, see Figs. 1, 2, 4 and 5. For the purpose of intermittently raising the elevator 7 to maintain the top of the sheet pile P at a substantially constant level, I have provided means including a feeler in the form of a finger 20 which rests on the topmost sheet S at its transverse center adjacent its rear edge, said feeler being adjustably secured by a winged clamp nut 21 to the outer end of a horizontal arm 22 freely fulcrumed at 23 to a rearward bracket extension 24 of the machine frame, see Figs. 3, 9 and 10, and having limited movement within the range of the pin-and-slot means at 25. Somewhat forward of its fulcrum 23, the arm 22 carries a stud 26 which overreaches the short lateral arm 27a of a vertical trip lever 27 free to rock about a fixed pivot 28. The trip lever 27 normally occupies the position shown in Fig. 9 with its upper end engaged beneath a stop projection 29a on the arm 29 freely fulcrumed on the shaft 17 and held against lateral displacement thereon between two ratchet wheels 30 and 31 affixed to said shaft. The normal engagement of the projection 29a on the arm 29 with the top of the trip lever 27 is maintained by the action of a helical tension spring 32 whereof one end is connected to said arm at 33 and the other end to a fixed anchorage 35 on the machine frame. Pivoted on the arm 29 at 36 is a pawl 37 which is maintained in cooperative relation with the teeth of the ratchet 30 by a spring 38. Reverse rotation of the shaft 17 is prevented by a detent 39 held in operative engagement with the teeth of the ratchet wheel 31 by a spring 40, said detent being freely pivoted to the top end of an upstanding bearing support 39a on the side frame 3. At its outer end, the arm 29 carries a stud 41 which engages an elongated slot 42a at the top end of a vertical link 42 whereof the lower end is pivotally connected to a rocker arm 43 which constantly oscillates about a fixed fulcrum 45, the slot being of such length as to allow the rocking means to remain quiescent so long as the top sheet S of the pile P on the elevator 7 is at the proper level. However, as the pile dwindles slightly and the feeler 20 drops, the vertical trip lever 27 is withdrawn from beneath the stop 29a on the arm 29, with the result that the latter is actuated through the link 42 from the rocker arm 43 until the normal condition is re-established with the pile at the proper height, when said trip lever will again engage beneath the stop projection on said arm. As shown in Figs. 2 and 10, the rocker arm 43 is actuated by a pair of intermeshing segmental bevel gears 46 and 47 whereof the latter is connected to an arm 48 which oscillates about a fixed fulcrum 49 (Fig. 2) on the frame 3 at the outside, through a link 50 from a crank pin 51 on a spur gear 52 affixed to one end of a transverse rotary shaft 53. Mounted on the fixed cross rod 14 at the longitudinal center of the machine, Figs. 5, 9 and 10, are three collars 55, 56 and 57 whereto are pivoted three pendent arms 58, 59 and 60 which engage the pile P at the back. Adjustably secured to the outer arms 58 and 60 by screws 61 are a pair of outwardly extending lateral arms 62 and 63 having at their ends, tapered stud projections 64 and 65 that slightly overlie the rear edge of the top sheet in the pile. By means of a tension spring 66 connecting the lower ends of the two outermost arms 58 and 60, the stud projections 65 and 66 are pressed yieldingly down on the top sheet in the pile at well spaced points and caused to follow the pile downward as the sheets S are successively removed. The position of the pile P on the elevator 7 is determined and maintained through engagement of its front corners within the hollows of vertical guide angle bars 67 which are suitably secured to the machine framework. Supported with capacity for axial up-and-down adjustment at the opposite sides of a central vertical abutment bar 68 for the front of the sheet pile P is a pair of rods 69 respectively whereof the upper ends are laterally bent as at 69a in Figs. 7 and 8 to slightly overreach the topmost sheet in the pile for the purpose of controlling the sheet at its front edge, also in a manner later on explained. The feeding mechanism I further includes a gripper means which consists of a relatively short tube 70 which is vertically arranged and at its lower end carries a pair of laterally spaced suction cups 71 of resilient material such as rubber or the like, the upper end of said tube being connected by a flexible hose 72 with piping 73 which leads from a rotary blower 74 suitably supported in the open pedestal portion of the machine framework, see Figs. 1, 3 and 14. Clamped to the tube 70 are a pair of collars 75 and 76 whereof the upper one is pivotally connected at 77 to the end of a clevised lifting arm 78 fast on a transverse rock shaft 79. Also affixed to the rock shaft 79 is an arm 80 having a roller 81 in the path of a cam 82 on a rotary shaft 83 immediately below said rock shaft, said roller being held in yielding engagement with said cam by a helical tension spring 84 which at one end is connected to the end of a third arm 85 fast on said rock shaft, and at the other to a fixed anchorage 86. The lower collar 76 on the tube 70 is coupled by means of a link 87, with a pendent arm 88 affixed to a parallel rock shaft 89 which extends alongside the rock shaft 79. Fast on the rock shaft 89 adjacent the outside of the side frame 3 is an arm 90 with a roller 91 in the path of a second cam 92 on the rotary shaft (see Figs. 4 and 7). By means of another helical spring 93 in tension between the end of an angular arm 94 on the shaft 89 and the fixed anchorage 86, the roller 91 on the arm 90 is yieldingly maintained in contact with the cam 92. As shown in Fig. 7, a connecting link 95 serves to maintain the collars 75 and 76 properly spaced on the tube 70. The cams 82 and 92 are so positioned circumferentially of the shaft 83 as to first cause the suction cups 71 at the lower end of the tube 70 to be depressed onto the top sheet S of the pile P immediately inward of its front edge as shown in Fig. 8, then to cause the gripper means to be raised so that the front edge of the sheet is lifted clear of the hold-down stops 69a, and finally to cause the said gripper means to be swung about the pivot 77 to advance the sheet to the scoring and severing mechanism 2 of the machine. Individual removal of the sheets S is insured by the action of an air-blast means which keeps the upper portion of the pile P opened up as shown in Figs. 5 and 7. This air-blast means includes vertical pipes 96 which are positioned at opposite sides of the central stop bar, and which have slit-like discharge outlet apertures 96a adjacent their upper ends. The lower ends of the pipes 96 are connected through flexible hoses 97, to a pipe 98 leading from a compressed air reservoir 99 which is in turn connected by a pipe 100 to the discharge side of the rotary blower 74.

Thus a single source serves both for the suction and for the pressure air necessary to the operation of the feeding mechanism. The blower 74 is constantly driven during the operation of the machine, through a sprocket chain connection 101, from an electric motor 102 suitably supported within the open pedestal portion of the machine framework.

Interposed in the piping 73 is a valve 105 (see Fig. 5) whereof the stem 105a is engaged by one end of a centrally-pivoted spring-pressed lever 106, which, at its opposite end, carries a roller 107 in contact with a cam 108 on another rotary shaft 109 in the interval between the side frames 3 and 4 of the machine. The edge of the cam 108 is so shaped as to actuate the valve 105 for interruption of the suction when the front edge of the sheet has been advanced to a horizontal table plate 110 which is supported by spaced girts 111, 112 of the machine framework. As shown in Fig. 7, the plate 110 is overhung by transversely spaced longitudinally extending hold-down strips 113 whereof the outermost ones extend beyond the rear edge of said plate and over the sheet pile P as at 113a. The rear ends of the remaining intermediate strips 113 are inclined upwardly as at 113b, while the corresponding end of the plate 110 is rounded downwardly as at 110a for more ready entry of the sheets S between them. As shown in Fig. 5, the guard strips 113 are supported by hangers 114 clamped to transverse supporting bars 115. At the receiving edge of the plate 110 are pairs of superposed nip rolls 116 and 117 whereof the lower ones are secured to a transverse rotary shaft 118 and operate upwardly through cut-outs in said plate, and whereof the upper ones are much narrower and operate in the intervals between certain of the guard strips 113. As further shown in Fig. 5, the upper rolls 116 are supported by horizontal arms 119 extending rearwardly from a transverse rock shaft 120 directly above the girt. A spring 121 in tension between the fixed anchorage 86 and the end of a vertical arm 122 affixed to the rock shaft 120, serves to maintain the upper nip rolls 116 in yielding contact normally with the lower nip rolls 117. Provisions are made for separating the rolls 116 and 117, that is to say, for lifting the upper rolls 116 temporarily away from the lower rolls 117, to facilitate entry between the two sets of the sheets S as the latter are successively advanced from the pile P. The means for accomplishing such movement of the upper nip rolls 116 comprises a cam 123 (Fig. 8) fast on the rotary shaft 109 immediately to the outside of the frame 4, said cam acting on a roller 124 at the end of an arm 125 secured to the rock shaft 120, see Fig. 1. Accordingly, as the high part of the cam 123 under-travels the roller 124, the shaft 120 is rocked to lift the upper nip rolls 116 away from the lower nip rolls 117 for the purpose above stated. Immediately beyond the girt 111 in the direction of feeding is another group of nip rolls including a pair of upper rolls 126 and a lower roll 127 which extends across the width of the machine, the upper rolls 126 being carried by forwardly extending arms 128 free on the rock shaft 120 and yieldingly urged downward by torsion springs shown at 129 in Figs. 4 and 11.

As shown in Fig. 1, the scoring and severing mechanism 2 of the machine is stationed immediately beyond the feeding mechanism 1 which has just been described. By reference to Figs. 5 and 6 it will be observed that the mechanism 2 comprises fixed die members 130 which are supported in spaced relation longitudinally of the machine in a centrally open bed 131 which extends crosswise of the machine frames 3 and 4. Arranged to cooperate with the fixed dies 130 are scoring blades 132 which are suitably secured in a cross head 133 which is confined to up and down movement by guide posts 135 upstanding from the side frames 3 and 4. Reciprocatory motion is imparted to the head 133 through a pair of eccentric straps 136 which engage eccentrics 137 affixed to the opposite ends of another crosswise extending rotary shaft 138. As shown in Figs. 2 and 12, the bearing portions of the pivot trunnions 139 for the upper ends of the straps 136 are eccentric to the trunnion shanks 139a which pass through the ends of the head 133. By rotatively adjusting the trunnions 139 in one direction or the other, it is possible to vary the downward limit of movement of the head 133, and hence that of the scoring blades 132, accidental shifting of the trunnions 139 in adjusted positions being prevented by clamp nuts 139b which engage the threaded inner ends of the trunnion shanks 139a, see Fig. 12. The sheets S successively taken from the pile by the gripper means 71 of the feeding mechanism are advanced over the table 110 by the nip rolls 116, 117 and 126, 127 until arrested over the bed 131 when the head 133 is in raised position, by a pair of stops 140, see Figs. 5 and 6. Retrograde movement of the sheets S while the scoring is being done is prevented through cooperation between a pair of friction rolls 141 which are mounted on a rotary shaft 142 beneath the table plate 110, and a plurality of gravity balls 143 which are loosely held against displacement in the direction of sheet travel in fixed holder devices 144, and which rest on the sheets S directly above said friction rolls. As shown in Fig. 6, the rolls 141 and the balls 143 are located mid-way between the scoring dies 130. As each sheet is rapidly advanced over the table plate 110 to the scoring means by the rolls 126, 127 the balls 143 attain considerable momentum and tend to urge the sheet forward by frictional action thereupon notwithstanding its being arrested by the stops 140. To make the arresting of the sheet doubly sure, fixed stops 145 are attached to the trailing edges of the outermost of the hold-down strips 113, see Figs. 5, 15 and 16, to catch the rear edge of the sheet as said edge springs up slightly upon clearing the rolls 126, 127. Beyond the scoring means in the direction of sheet travel in the machine is another advancing means including a continuous upper nip roll 146 and a pair of lower nip rolls 147. As shown, the upper nip roll 146 extends across the width of the machine, while the lower nip rolls 147 are individually carried by horizontal arms 148 affixed to a transverse supporting rock shaft 149. At that end of the shaft 149 which protrudes through the side frame 4 is secured a pendent arm 150 having a roller 151 in contact with a rotary cam 152 on still another transverse shaft 153, said roller being held yieldingly in contact with the cam by a spring 155 (see Fig. 1). The cam 152 is so positioned on the shaft 150 that during scoring with the head 133 down and the sheets stationary, the upper nip rolls 146 are held elevated as shown in Fig. 5. Immediately after each scoring has been accomplished the stops 140 are moved downwardly out of the way, being for this reason secured to still another transverse rock shaft 156 whereto is also secured an arm 157 having a roller 158 running in engagement with a cam 159 on the rotary shaft 153, such engagement being maintained by the action of a spring 161 in tension between the fixed anchorage 162 on the side frame 4 and a pendent arm 163. The timing of the cam 159 is such as to determine the withdrawal of the stops 140 concurrently with downward movement of the upper nip rolls 146 into contact with the lower nip roll 147 so that the scored sheet is grasped and advanced still further on the table 110.

Centralization of the sheets on the table plate 110 at the scoring means is effected by a pusher 164, see Figs. 4, 13 and 15, pivotally connected to the pendent extremity of an arm 165 which is medially fulcrumed to rock on a stud 166 on a collar 167 supported by a cross bar 168. As shown, the pusher 164 is pressed downward for maintenance in yielding contact with the top surface of the table plate 110 by a finger spring 169. Normally the pusher 164 is held retracted by a helical tension spring 170, but as the scoring head 133 begins to descend, it is moved laterally inward of the table plate 110 to the position shown in Fig. 13 by the action of a cam edge 171 on said head upon a roll 172 on the upper extremity of the arm 165. During this inward shift, the pusher 164 engages one side edge of the sheet and properly positions the sheet before the scoring blades 132 enter the grooves of the fixed dies 130. As shown in Fig. 13, the collar 167 is adjustable along the bar 168 by means of a regulating screw 173, and is securable in adjusted positions by a set screw 174.

Beyond the nip rolls 146 and 147, additional guard strips 175 serve to hold the passing sheets to the table plate 110, said additional strips being supported by suspension brackets 176 from the bar 168. After being transversely scored, each sheet is severed crosswise of the scoring lines into smaller sections or slips S' by superposed pairs of cooperating cutting rolls 177, 178 having sharpened peripheral knife fins 179 and 180 in shearing engagement. The cutting rolls 177 and 178 are mounted with capacity for adjustment in spaced relation lengthwise respectively of transverse rotary shafts 181, 182, the sheets S being fed to them by an advance pair of fluted auxiliary nip rolls 183, 184 which receive said sheets from the nip rolls 146 and 147. The endmost pairs of the severing rolls 177, 178 serve to trim off the excess at the side margins of the sheets S, the trimmings T being deflected downward about the roll by curved stripper guards shown at 185 in Figs. 5, 15 and 16. An oil saturated flap 186 of felt or the like suspended from another fixed cross bar 187 on the machine framework wipes against the knife fins 179 on the upper cutting rolls 177 to keep the shearing edges lubricated. After being cut from the sheets S by the severing rolls, the cut sections or slips S' are advanced by another auxiliary pair of superposed fluted nip rolls 188, 189 to a plurality of laterally spaced horizontal belts 190, the top runs of which are at a level slightly below the nip of said rolls, being directed downward onto said belts by deflecting guards 191. As shown in Fig. 1, the belts 190 are trained about end pulleys 192 and 194 which are suitably journaled in forward bracket extensions 195 and 196 of the side frames 3 and 4, the upper runs of said belts being supported in their travel by a sustaining plate partly shown at 197 in Fig. 4. The belts 190 are individually tensioned by idler rolls 198 individually carried by arms 199 which are fulcrumed on a transverse rod 200 and which are subject to gravity influence, the lower run of the belt being diverted adjacent the pulley 192 by another idler roll 201 which revolves about a fixed axis. In passing beneath the deflecting guards 191, the cut sections or slips S' are held to the belts 190 by individually cooperating gravity influenced rolls 202 which are loosely held between collars 202a on a cross shaft 203. The ends of this cross shaft 203 are fixed in a pair of suspension arms 204 hung from bracket arms 205 which are adjustable about fixed pivots 206 on the side frames 3 and 4 of the machine. As shown in Fig. 1, the belts 190 deliver the cut sections or slips S' to a receiver 207 from which they may be removed from time to time by an attendant and packed into bundles of a convenient size.

The machine is powered by an electric motor 210 supported by a platform 211 between the side frames 5 and 6 of the pedestal portion of the machine framework. Through a speed reducing sprocket chain connection 212 the motor 210 drives a transmission shaft 213 which is journaled in the side frames 5 and 6 and in turn connected by means of a sprocket chain 214 to a shaft 215 (Fig. 5). Through a pair of spur pinions 216 and 217 rotary motion is communicated from the shaft 215 to a gear wheel 218 on the shaft 138 which carries the eccentrics 136 for actuating the scoring head 133. Also meshing with the gear wheel 218 is a pinion 219 which drives a pinion 220 on a cross shaft 221. On that end of the latter which protrudes through the side frame 3, see Fig. 2, the shaft 221 carries a spur pinion 222 which drives a gear wheel 223 on the shaft 109 of the valve operating cam 108, said gear wheel having meshing therewith spur pinions 225 and 226 respectively secured to the shafts 118 and 127a of the nip rollers 117 and 127. As further shown in Fig. 2, the pinion 225 drives an idler spur gear 229 with an attached coaxial pinion 230 in driving mesh with the gear wheel 52 on the shaft 53 of the feeding mechanism 1. The shaft 83 of the feeding mechanism 1 is driven through a spur gear 232 fast thereon and in mesh with the gear wheel 229. Again referring to Fig. 2, a spur pinion 235 at the near end of the transmission shaft 215 drives an intermeshing gear wheel 236 on the shaft 153 of the stop operating cam 159, and from this gear wheel, the shafts 142, 147a, 181, 182, 183a, 184a, 188a and 189a of the various rotary elements embodied in the scoring and severing mechanism 2 are actuated through gear trains which include pinions 231, 238, 239, 240, 241, 242, 243, 244, 245, 246 and 247. The shaft 193 carrying the pulley 192 for the belts 190 is driven through a sprocket chain connection 250 from a speed reducer 251 in turn driven from the transmission shaft 213 by a sprocket chain connection 252. In this connection, it is pointed out that the surface speed of the belts 190 is considerably less than that of the nip rollers 188, 189 so that the cut sections S' are caused to overlap each other as shown in Fig. 15 and to gather in piles, in the receiver 207. The fluting of the lower nip roller 189 is also of importance in that it insures depression of the trailing edges of one group of the cut sections so that they will be overlapped by the leading edges of the next group. The various gear elements which have just been described are so proportioned as to render the operation of the machine continuous with avoidance of any tendency to clog as the sheets S are passed through it for scoring and sub-division into the smaller sections. For convenience of the attendant or operator, the switches indicated at 255 and 256 for the blower and driving motors 102 and 210 respectively are placed at the delivery end of the machine, being secured to the frame extension 196 at the side of the machine illustrated in Fig. 1.

In order that the machine may be manually operated, if necessary for any reason, a hand wheel 257 is affixed to the near end of the transmission shaft 215 in Fig. 1, while adjustment of the elevator means of the feeding mechanism 1 is made possible by means of a hand wheel 258 affixed to the outer end of the shaft 17, see Figs. 1, 2 and 5. The machine is moreover provided with an auxiliary suction shut-off valve 259 which is interposed in the piping 73 and which is manually operable through a rod 260 extending forward to the delivery end of the machine where it is formed with a rotatable handle 261 as also shown in Fig. 1. In addition, there is shown at 262 in Fig. 1 a regulatable bleed valve by which the suction may be varied when necessary or required.

As hereinbefore stated, the machine of my invention when arranged as illustrated and described is especially useful in the production of creased or scored toll sheets for telephone companies from sheets having imprinted thereon lines and legends in duplicate to serve for the respective cards. Such sheets and cards are typified conventionally in Fig. 15 and need not therefore be described in detail. My improved machine is not, however, limited to such employment, since, by suitable modifications within the scope of the appended claims, it may be readily adapted to scoring and sub-dividing sheets of paper or cardboard, or even sheet metal blanks differently from the way herein disclosed by way of example.

Having thus described my invention, I claim:

1. In a scoring and severing machine, mechanism for scoring individual sheets of paper or the like and cutting them up into a plurality of smaller sections; and mechanism for removing the individual sheets from a supply pile and feeding them to the scoring and severing mechanism, including a pair of nip rollers, a vacuum gripper in the form of an upright tube with a suction cup at its lower end, a lift arm to which the tube is pivotally connected, a second arm for swinging the tube about its pivotal connection with the lift arm, and a rotary shaft with cam means thereon for actuating said arms in timed relation, so that the gripper is first moved downward into engagement with the top sheet of the supply pile and then upward and laterally to advance the sheet to the nip rollers, suction control means, and means for actuating the suction control means for release of the sheet upon its delivery to said nip rollers.

2. A scoring and severing machine according to claim 1, in which the feeding mechanism further includes means operative to keep the upper part of the supply pile opened up thereby to facilitate the successive removal of the top sheets in the manner set forth.

3. A scoring and severing machine according to claim 1, in which the feeding mechanism further includes nozzle means for blasting air under pressure laterally into the upper portion of the pile thereby to keep that part of the pile opened up in order to facilitate the successive removal of the top sheets in the manner set forth.

4. A scoring and severing machine according to claim 1, in which the feeding mechanism further includes means for holding down the pile while permitting successive removal of the top sheets in the manner set forth.

5. A sheet scoring and severing machine according to claim 1, in which the feeding mechanism further includes means having slight projection respectively over the front and rear edges of the top sheet in the pile for holding said pile down while permitting successive removal of the top sheets in the manner set forth.

6. A sheet scoring and severing machine according to claim 1, in which the gripper means engages the top sheet in the pile somewhat rearward of the leading edge; and further including presser means for engaging the topmost sheet adjacent its rear edge, and hold-down means extending over the front edge of the pile to normally hold it down while permitting successive removal of the top sheets in the manner set forth.

7. A scoring and severing machine according to claim 1, in which the support for the sheet supply pile is in the form of an elevator; and in which the feeding mechanism further includes means for automatically raising the elevator as the supply thereon dwindles to maintain the top of the pile at a substantially constant level.

8. A scoring and severing machine according to claim 1, in which the support for the sheet supply pile is in the form of an elevator; and in which the feeding mechanism further includes a gravity feeler which normally rests on the top of the pile, a normally quiescent shaft carrying a pair of sprocket wheels from which the elevator is suspended by means of chains, and racking means controlled by the feeler and automatically actuated when said feeler drops slightly to rotate the normally quiescent shaft for the purpose of raising the elevator automatically and thereby maintaining the top of the pile at a substantially constant level.

9. In a scoring and severing machine, mechanism for scoring individual sheets of paper or the like and cutting them up into a plurality of smaller sections; and mechanism for removing the sheets individually from a supply pile and feeding them to the scoring and severing mechanism, including a pair of nip rollers, a suction blower, a vacuum gripper in communication with the suction side of the blower, suction control means interposed between said gripper and the blower, means for moving the gripper first downward into engagement with the top sheet of a supply pile and then upward and laterally to advance the sheet to the nip rollers, and nozzle means connected to the pressure side of the blower aforesaid for blasting air under pressure laterally into the upper portion of the pile to keep that portion of the pile opened up and thereby facilitate successive removal of the top sheets.

10. In a scoring and severing machine, mechanism for scoring individual sheets of paper or the like and cutting them up into a plurality of smaller sections; and feeding mechanism for removing the sheets individually from a supply pile and advancing them to said scoring and severing mechanism, including a pair of superposed nip rollers, a vacuum gripper in communication with a source of constant suction, suction control means interposed between said gripper and the suction source, means for moving the gripper first downward into engagement with the top sheet of the supply pile and then upward and forward to advance said sheet to the nip rollers, and means for actuating the suction control means to interrupt the suction for release of the sheet upon its delivery to said nip rollers; and hold down means including a pair of pivotally suspended arms having lateral extremities with projections at their ends overreaching the top of the pile adjacent the rear edge of the same, and a tension spring connecting the lower ends of said arms to keep said projections in yielding contact with said pile.

11. In a scoring and severing machine, mechanism for scoring individual sheets of paper or the like and cutting them up into a plurality of smaller sections; and feeding mechanism for removing the sheets individually from a supply pile and advancing them to said scoring and severing mechanism, including a pair of superposed nip rollers, a vacuum gripper in communication with a source of suction, suction control means interposed between said gripper and the suction source, means for moving the gripper first downward into engagement with the top sheet of the supply pile and then upward and forward to advance said sheet to the nip rollers, and means for actuating the suction control means to interrupt the suction for release of the sheet upon its delivery to said nip rollers, and means for temporarily separating the nip rollers until the leading edge of the sheet is in position between them.

12. In a scoring and severing machine, mechanism for scoring individual sheets of paper or the like and cutting them up into a plurality of smaller sections; and feeding mechanism for removing the sheets individually from a supply pile and advancing them to said scoring and severing mechanism, including a pair of superposed nip rollers, a vacuum gripper in communication with a source of constant suction, suction control means interposed between said gripper and the suction source, means for moving the gripper first downward into engagement with the top sheet of the supply pile and then upward and forward to advance said sheet to the nip rollers, and means for actuating the suction control means to interrupt the suction for release of the sheet upon its delivery to said nip rollers, and means for separating the nip rollers until the leading edge of the sheet is in position between them, and for restoring them to engage the advancing sheet upon relief of the vacuum in the gripper means.

13. In a scoring and severing machine, mechanism for scoring individual sheets of paper or the like and cutting them up into a plurality of smaller sections; and feeding mechanism for removing the sheets individually from a supply pile and advancing them to said scoring and severing mechanism, including a pair of superposed nip rollers, a vacuum gripper in communication with a source of constant suction, suction control means interposed between said gripper and the suction source, means for moving the gripper first downward into engagement with the top sheet of the supply pile and then upward and forward to advance said sheet to the nip rollers, means for actuating the suction control means to interrupt the suction for release of the sheet upon its delivery to the nip rollers, one of said nip rollers being fixed in position and the other one carried by an arm subject to spring influence, and means for actuating the supporting arm of the movable roller so that the latter is temporarily withdrawn from its mate as the sheet is advanced in the manner set forth, and subsequently released to the action of the spring to permit the roller to grasp said sheet.

14. In a scoring and severing machine, mechanism for scoring individual sheets of paper or the like and cutting them up into a plurality of smaller sections; and feeding mechanism for removing the sheets individually from a supply pile and advancing them to said scoring and severing mechanism, including a pair of superposed nip rollers, a vacuum gripper in communication with a source of constant suction, suction control means interposed between said gripper and the suction source, means for moving the gripper first downward into engagement with the top sheet of the supply pile and then upward and forward to advance said sheet to the nip rollers, means for actuating the suction control means to interrupt the suction for release of the sheet upon its delivery to the nip rollers, one of said nip rollers being fixed in position and the other one carried by an arm subject to spring influence, and means for actuating the supporting arm of the movable roller so that the latter is temporarily withdrawn from its mate as the sheet is advanced in the manner set forth, and later on released to the action of the spring to permit the roller to grasp said sheet at the time that the suction to the gripper means is cut off.

15. In a scoring and severing machine, scoring and severing mechanism including scoring means with a pair of scoring elements which are movable toward and away from each other, cutting means, a pair of normally separated nip rolls in an interval between said scoring and severing means, stop means for arresting individual sheets of paper or the like successively fed into position between the scoring elements, and means operative after the scoring to withdraw the stop means and bring about the engagement of the nip rolls for advance of the successively scored sheets to the cutting means; and feeding means for successively removing the sheets from a supply pile and advancing them to the scoring means.

16. A scoring and severing machine according to claim 15, in which the scoring means has scoring blades that extend crosswise of the path of advance of the sheets and in which the severing means comprises opposing pairs of rotary cutting knives in shearing relation which are laterally spaced transversely of the direction of advance of the sheets.

17. A scoring and severing machine according to claim 15, with means for preventing rebound of the sheets relative to the stops, including a constantly rotating roller which tends to urge the sheets toward said stops, and a freely supported gravity ball to engage the sheets above the constantly rotating roll.

18. A scoring and severing machine according to claim 15, with means for preventing rebound of the sheets relative to the stops, including a constantly rotating roller which tends to urge the sheets toward said stops, a freely supported gravity ball to engage the sheets above the constantly rotating roll, and another stop means for engaging the rear edges of the sheets concurrently with the arrest of the latter by the first stop means.

19. A scoring and severing machine according to claim 15, in which the cutting means comprises opposing groups of rotary knives in shearing engagement, nip rolls forward and rearward of the cutting knives to assist in advancing the sheets through the cutting means, and delivery belt means for conveying the severed sections away from the cutting means.

20. A scoring and severing machine according to claim 15, in which the cutting means comprises opposing groups of rotary knives in shearing engagement, nip rolls forward and rearward of the cutting knives to assist in advancing the sheets through the cutting means, delivery belt means for conveying the severed sections away from the cutting means; and means for driving the belt means at a surface speed slower than that of the nip rolls so that the severed sections arrange themselves in overlapping relation on said belt means.

21. In a scoring and severing machine, scoring and severing mechanism including scoring means with a pair of die elements which are movable toward and away from each other, means automatically operated through relative movement of the die elements in closing to laterally engage sheets to center them as they are individually advanced for scoring, severing means, and intermittently operative means for advancing the scored sheets from the scoring means to the severing means for sub-division into plural smaller sections; and feeding mechanism for feeding the sheets successively to said scoring means.

22. A scoring and severing machine according to claim 21, in which the sheet centering means comprises a pivotally supported pusher, and cam means on one of the die elements for actuating said pusher.

GEORGE D. COX.